United States Patent [19]

Lipps

[11] Patent Number: 5,052,637
[45] Date of Patent: Oct. 1, 1991

[54] ELECTRONICALLY STABILIZED TRACKING SYSTEM

[75] Inventor: Gary D. Lipps, Orlando, Fla.

[73] Assignee: Martin Marietta Corporation, Bethesda, Md.

[21] Appl. No.: 497,611

[22] Filed: Mar. 23, 1990

[51] Int. Cl.$^5$ .............................................. F41G 7/22
[52] U.S. Cl. ................................................ 244/3.15
[58] Field of Search ............................. 244/3.15, 3.19

[56] References Cited

U.S. PATENT DOCUMENTS

| | | | |
|---|---|---|---|
| 3,396,878 | 8/1968 | Cole et al. | 244/3.15 |
| 3,706,429 | 12/1972 | Welford et al. | 244/3.19 |
| 3,897,918 | 8/1975 | Gulick Jr. et al. | 244/3.19 |
| 3,924,824 | 12/1975 | Brodie et al. | 244/3.2 |
| 3,984,068 | 10/1976 | McPhee | 244/3.19 |
| 4,038,527 | 7/1977 | Brodie et al. | 244/3.2 |
| 4,168,813 | 9/1979 | Pinson et al. | 244/3.15 |
| 4,494,202 | 1/1985 | Yueh | 244/3.15 |
| 4,508,293 | 4/1985 | Jones | 244/3.15 |
| 4,542,870 | 9/1985 | Howell | 244/3.15 |
| 4,568,039 | 2/1986 | Smith et al. | 244/3.15 |
| 4,568,040 | 2/1986 | Metz | 244/3.22 |
| 4,830,311 | 5/1989 | Pritchard et al. | 244/3.15 |

Primary Examiner—Charles T. Jordan
Attorney, Agent, or Firm—Burns, Doane, Swecker & Mathis

[57] ABSTRACT

An electronically stabilizer tracking system is provided using a beam-steerable radiating array driven by parameters of motion of a body to which the array is mounted. In a specific application, the beam of a strapped down seeker is electronically gimballed to provide an inertially-stable observation platform. Potential instability caused by corrupted weapon-to-target angle information is therefore avoided. By using a fiber-optic gyro, the beam may be very accurately controlled to negate the guidance effects of body motion of the weapon.

20 Claims, 5 Drawing Sheets

ELECTRONICALLY STABILIZED TRACKING SYSTEM

BACKGROUND OF THE INVENTION

The present invention relates to an electronically stabilized tracking system and more particularly to such a system using a beam-steerable radar configuration.

Since the advent of radar, numerous applications of radar, both military and commercial, have been developed, particularly in the field of avionics. Until recently, however, airborne radars across diverse applications have typically shared the common feature of the radar antenna being inertially, or "gyroscopically", stabilized using mechanical means such that operation of the radar is not affected by movements of the aircraft. Such mechanical stabilization entails a set of common mechanical problems including wear, failure, and involved repair. Of late, radars have been developed that do not rely on moving parts, i.e., are not mechanical but operate wholly electronically. In order to provide stabilization as was previously provided mechanically, correction factors related to aircraft motion have been applied to radar returns downstream of the radar receiver itself. Such correction is not easily achieved and encounters serious difficulties when real-time decisions and responses are to be made based on the radar returns.

The present invention is directed toward providing radar beam stabilization at the beam itself and will find widespread use in applications involving tracking of a multiplicity of objects as, for instance, in collision avoidance systems and applications involving tracking of a single object as in homing devices and seekers. For simplicity, the present invention will be described in the context of a homing device tracking a single object, more particularly an electronically stabilized "strapped down" seeker for a guided weapon. From the following description, application of the present invention to situations involving tracking of a multiplicity of targets will become apparent.

The function of a seeker in a guided weapon system is to track the position of a moving target in much the same fashion as a human observer would, training its "sight" on the target and following the target's motion with its "head" in two dimensions, up/down and left/right. The sight of the guided weapon is typically provided by radar, and motion of a radar antenna in two dimensions has typically been achieved by mounting the antenna in a set of gimbals.

Although such an arrangement is common, it is not without drawbacks. The gimbal has associated with it significant inertia, tending to make tracking of the target sluggish. Furthermore, the mechanical nature of the gimbal with its moving parts renders it susceptible to wear, inaccuracy and failure.

Recent advances in millimeter wave technology have led to the development of beam-steerable "strapped down" seekers using phased-array antennas. The radiated beam of such an array may be scanned electronically by controlling the excitation phase of individual elements without the need for any moving parts. Although strapped down seekers present an attractive alternative to gimballed seekers, attempts at strapped down guidance have not been fully successful. Rather, strapped down guidance has always been regarded as high risk for precision guided weapons.

An object of the present invention, then, is to provide an electronically stabilized tracking system.

Another object of the present invention is to improve control of a guided weapon system using a strapped down seeker.

Another object of the present invention is to eliminate potential instability in a guided weapon control system using a strapped-down seeker.

A further object of the present invention is to eliminate adverse effects of body coupling in a strapped down guidance system.

A still further object of the invention is to provide an electronically gimballed, inertially stabilized strapped down seeker implementation.

SUMMARY OF THE INVENTION

According to the present invention, an array of antenna elements mounted in a first moving body is driven in accordance with parameters of motion of the first moving body so as to direct a beam of radiation from the array in a direction substantially independent of the motion of the first body. The beam of radiation may be used to track a second moving body. In a specific embodiment, a guided weapon is provided with an electronically-pointed antenna, a body motion detection device and means for pointing the antenna in such a direction as to compensate for body motion. The beam of the strapped down seeker is in effect electronically gimballed to provide an inertially stable observation platform. Potential instability caused by corrupted weapon-to-target angle information is therefore avoided. By using a fiber-optic or other suitable rate gyro, the beam may be very accurately controlled to negate the guidance effects of body motion of the weapon.

DETAILED DESCRIPTION OF THE PREFERRED EMBODIMENT

In guided weapon control systems using proportional navigational guidance (PNG), pitch and yaw line of sight rates from the guided weapon to a target are continuously measured and control steps taken to "null" the line of sight rates, or drive them to zero. The total line of sight may be imagined as being represented by an elastic strand stretched between the guided weapon and the target. Relative motion between the guided weapon and the target that moves the elastic strand up, down, left or right produces a non-zero line of sight rate that generates a corrective control action proportional to that line of sight rate. Simple contraction of the elastic strand with diminishing distance between the guided weapon and the target represents that the guided weapon is on a collision course and does not generate any corrective control action.

Unlike gimballed seekers, which are inertially stable, a strapped down seeker is "strapped down" to the frame of a guided weapon with the result that any maneuvers of the frame are per force transmitted to the seeker. The apparent LOS rate observed by the seeker is "body coupled" in that rotation of the weapon frame looks to the seeker like movement of the target. In order to find the true LOS rate, the contribution of body rotation to the apparent LOS rate must be negated. If such negation is performed only imperfectly, as must necessarily be the case, the presence of some remaining contribution of body rotation to the corrected LOS rate is known as residual body coupling. System tolerance for residual body coupling is extremely low, the effect of exceeding that tolerance being system instability.

Figure 1:
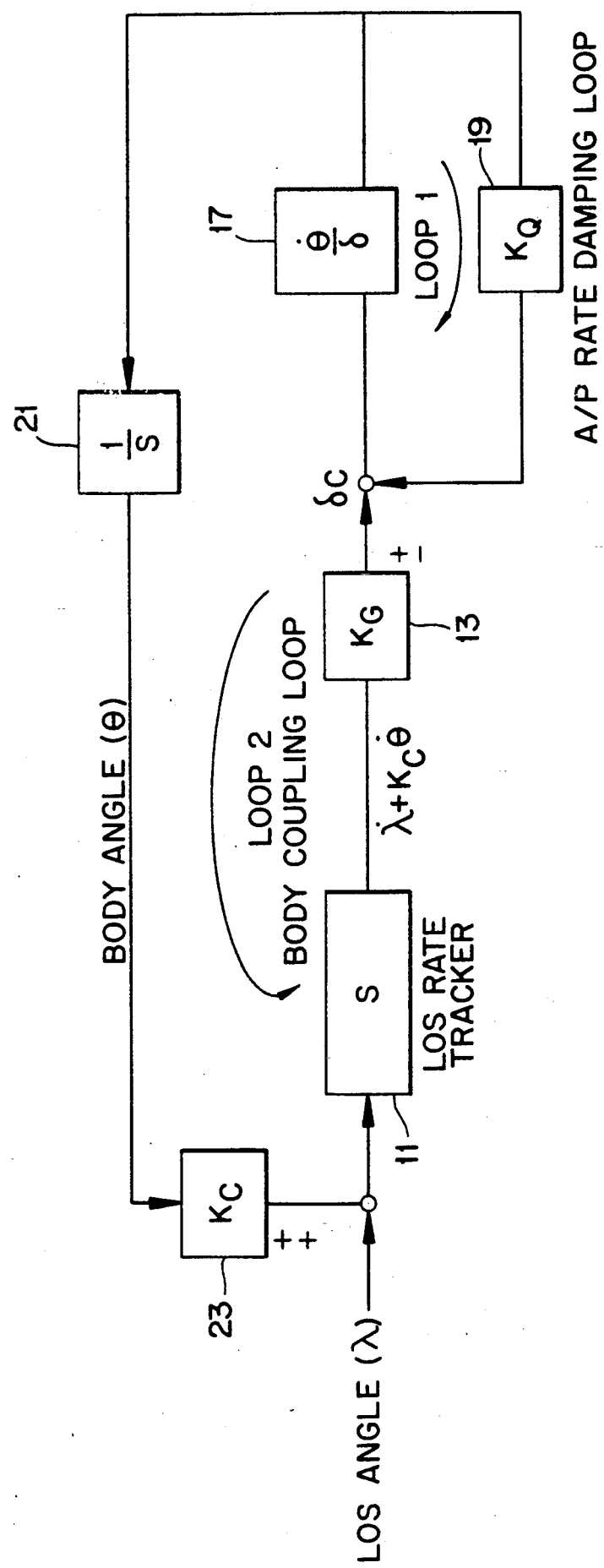
FIG. 1 is a block diagram illustrating potential stability problems associated with strapped down guidance.

Referring to FIG. 1 illustrating the effects of body coupling in a conventional seeker, Loop 1 represents a guidance or autopilot loop, whereas Loop 2 represents an unintended body coupling loop resulting from residual body coupling. An LOS angle λ is input to a target tracker 11 whose output is amplified in block 13 and input to the autopilot loop, having feed-forward and feedback gain elements 17 and 19, respectively. $K_C$, $K_G$ and $K_Q$ in blocks 23, 13 and 19 respectively represent a body coupling gain, a guidance gain and a damping gain. An angular velocity of the body frame is represented by θ. Since the target tracker tracks LOS rate (as required by PNG guidance), block 11 represents a differentiator. Block 21 is an integrator which converts body angular rate to body angle. Choosing typical values of $K_G=9$ and $K_Q=0.12$, a $K_C$ of 0.1 representing 10% residual body coupling results in a Loop 2 gain of $K_C K_G=0.1(9)$, which is manifest in Loop 1 as an 850% change in autopilot gain (block 17). Such a drastic change in gain causes small attitude perturbations to perturb the fins causing a change in attitude of the guided weapon, that change in attitude being coupled back through the loop to additionally perturb the fins, and so forth. By electronically gimballing the beam of a strapped down seeker to provide an inertially stable observation platform, the potential instability caused by corrupted line of sight rates may be avoided.

Figure 2:
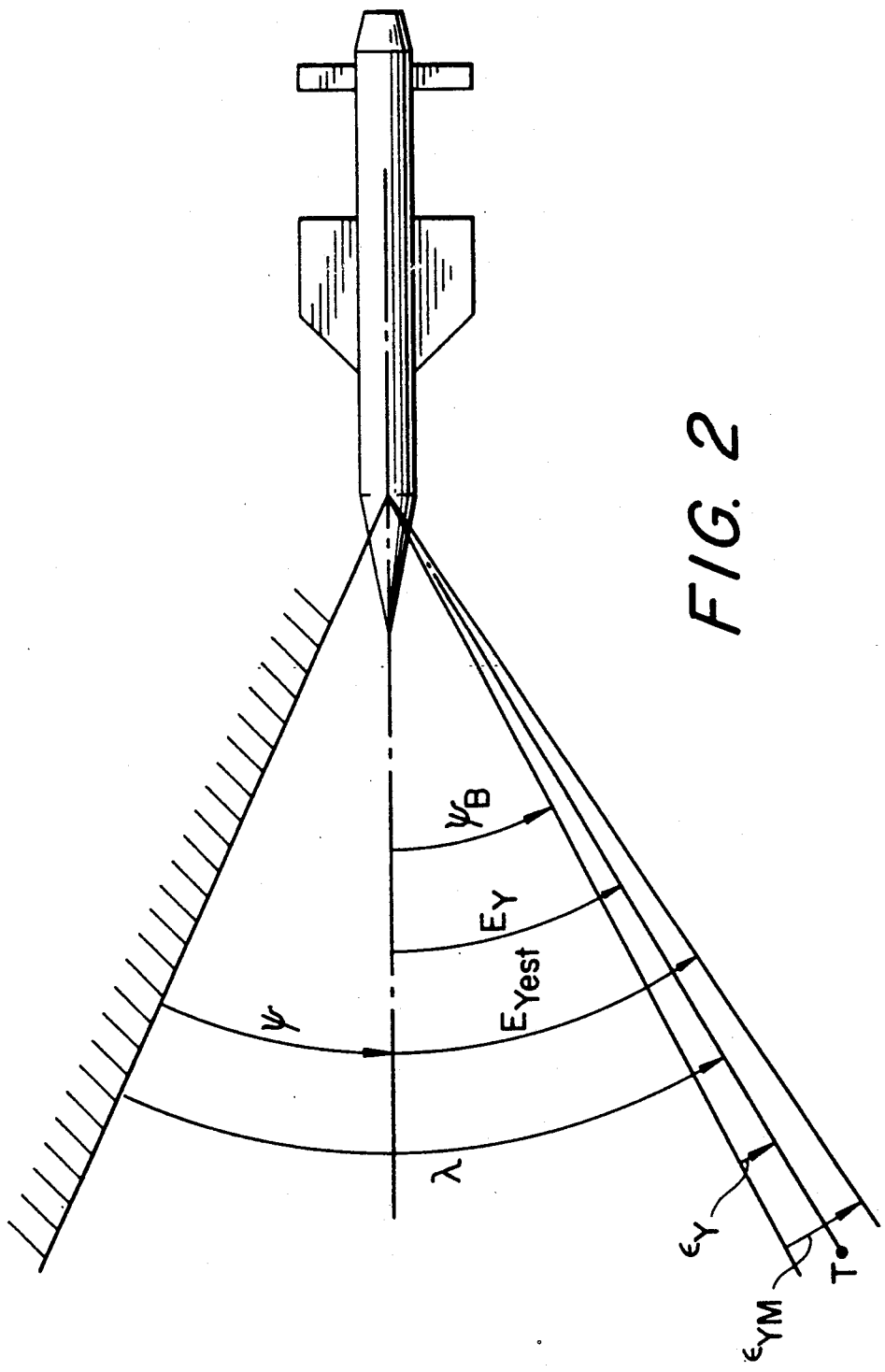
FIG. 2 is a diagram defining certain angles necessary to an understanding of the present invention.

Referring to FIG. 2, the various angles involved in tracking the position of a target in the horizontal plane include the angle λ to the target, the bearing angle ψ of the weapon, an error angle $E_Y$ being the difference between the previous two respective angles, an estimate $E_{Yest}$ of the previous actual angle based on radar returns, a beam position angle $\psi_B$ relative to the axis of the weapon, and a tracking error angle $\epsilon_{YM}$ being the difference between the seeker's best guess $E_{Yest}$ as to where the target is and the beam angle $\psi_B$. The situation in the vertical plane may be characterized similarly. For simplicity, however, the broader principles of the present invention will be described in relation to a single horizontal plane.

Figure 3:
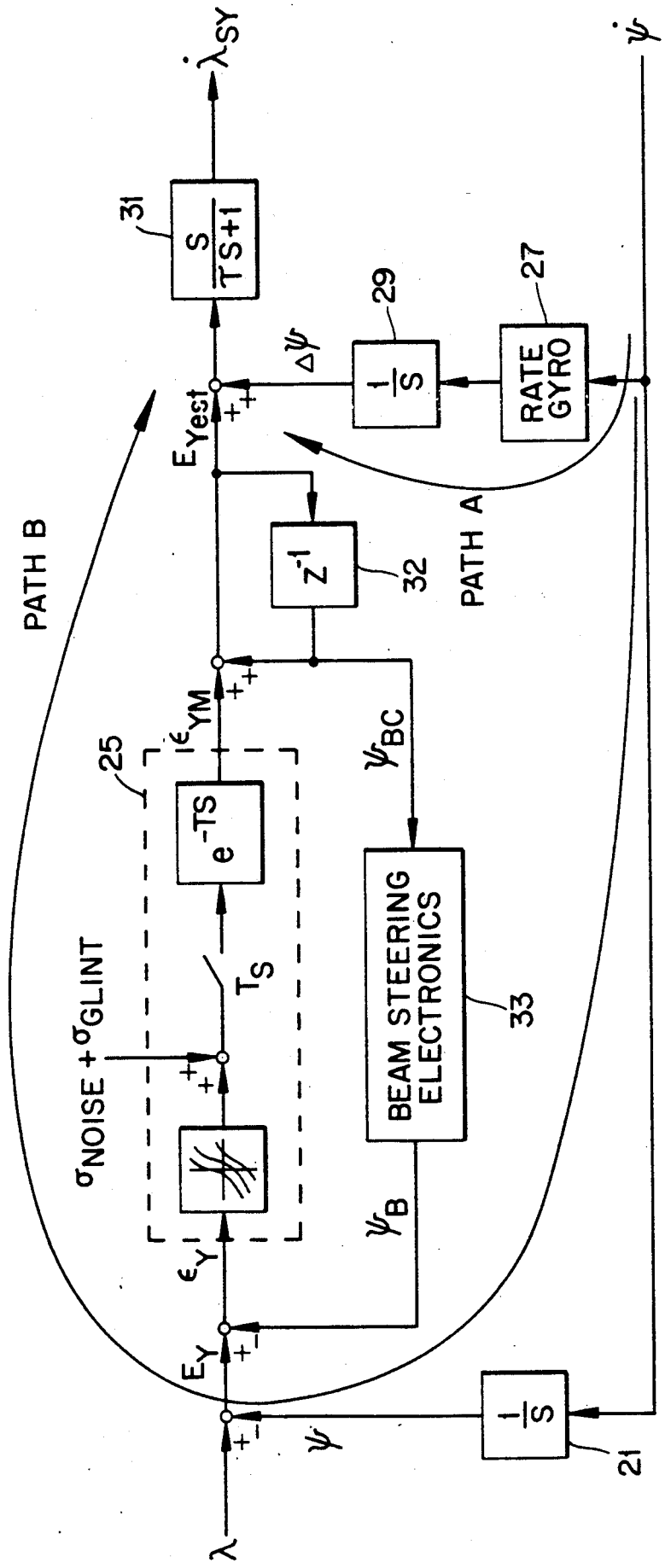
FIG. 3 is a block diagram illustrating a typical strapped down guidance arrangement.

Referring to FIG. 3, showing a typical body coupling loop using a strapped down seeker the line-of-sight angle λ becomes body coupled by operation of changes in the bearing angle of the weapon, ψ, and the integration depicted as block 21. The remainder of the blocks in FIG. 3 represent actual circuitry designed to uncouple the line-of-sight angle λ to produce as an output a stabilized LOS rate $\lambda_{SY}$. To this end, an angular error $\epsilon_Y$ between the bearing angle error $E_Y$ and the beam angle $\psi_B$, representing how far the beam is off track with respect to the target, is measured by the monopulse radar electronics 25 as $\epsilon_{YM}$, the measured angular error. To $\epsilon_{YM}$ is added the then current, beam position command $\psi_{BC}$ to arrive at a target angle estimate $E_{Yest}$, which is then used as a new beam command to beam steering electronics 33 to obtain a new target angle estimate $E_{Yest}$, and so forth. This iterative operation is represented using a simple Z-transform block, block 32. To arrive at an inertial line of sight from what is a body-relative LOS estimate, $E_{Yest}$ is corrected by a body attitude measurement Δψ taken by the series combination of a rate gyro 27 used to measure changes in the bearing angle of the weapon and an integrator 29. The resulting inertial LOS is then differentiated in block 31 to arrive at an inertial LOS rate.

Although the transmitter, or beam steering, portion of the strapped down seeker 33 exhibits excellent beam agility allowing the beam to be quickly and accurately pointed, the receiving portion 25 of the seeker is far less ideal. Nonlinearities, tracking noise and glint, sample and hold delays, phase lags and computational delays all operate to corrupt the bearing angle estimate $E_{Yest}$. These non-idealities are illustrated within block 25.

In the body coupling loop of FIG. 3, PATH A in effect attempts to cancel the body coupling effects introduced through the feedback portion of PATH B. Since those effects are introduced upstream of the monopulse radar electronics, while cancellation is attempted downstream of the monopulse radar electronics, effective cancellation can only occur if the monopulse radar electronics can be made to have a gain of unity. As previously described, however, the behavior of the monopulse radar electronics is highly non-ideal. PATH A and PATH B will inevitably not match in magnitude and phase, resulting in poor cancellation and high residual body coupling.

Figure 4:
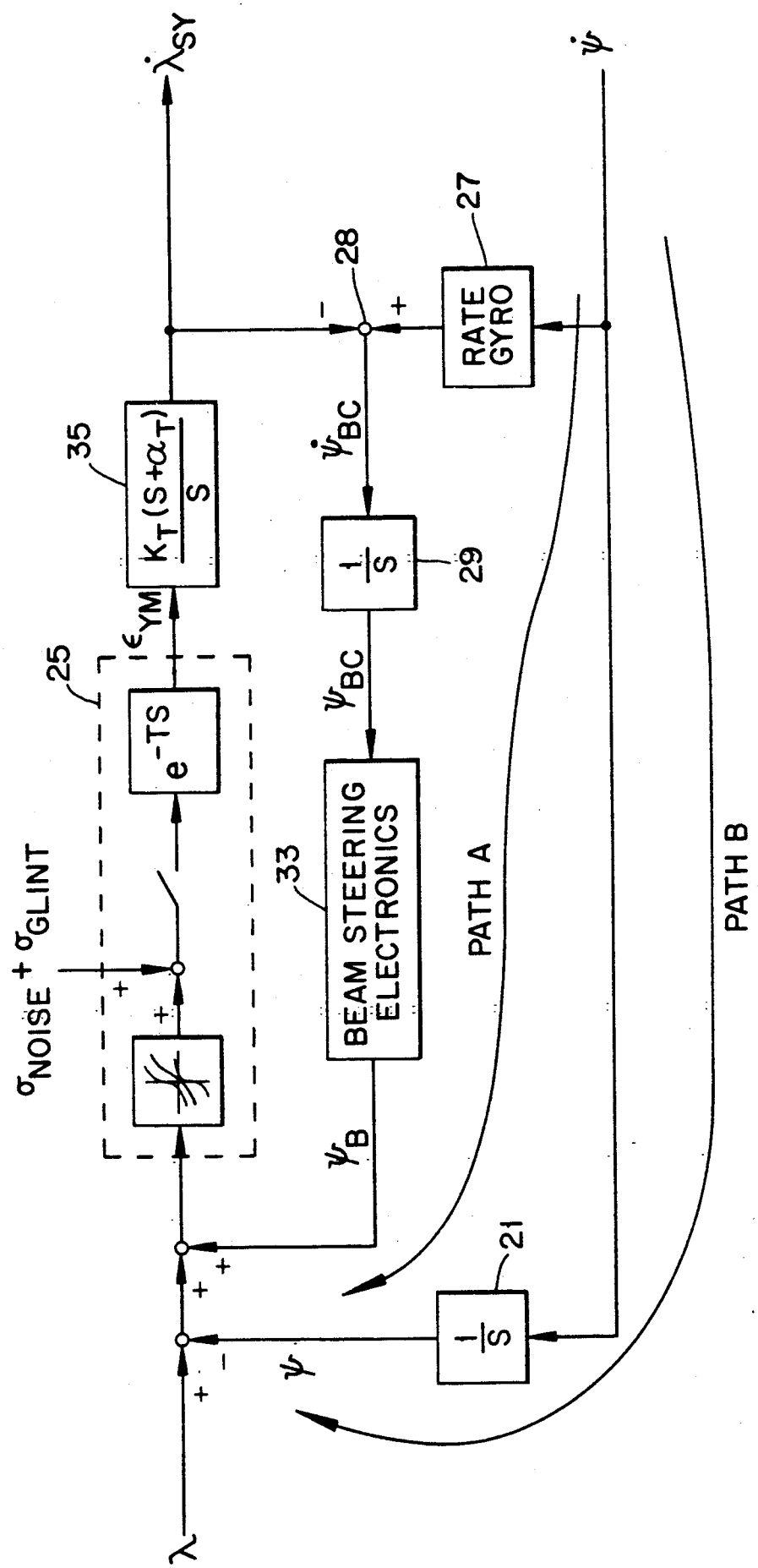
FIG. 4 is a block diagram illustrating a strapped down guidance arrangement of the present invention.

Referring to FIG. 4, in the embodiment of the present invention, the monopulse radar electronics 25 and the rate gyro 27 are arranged in like manner as in FIG. 3. The beam steering electronics, however, instead of being iteratively driven by the target angle estimate $E_{Yest}$, is continuously driven by the difference $$\frac{\partial \psi}{\partial t} - BC$$

between the rate of change of the weapon bearing angle and the LOS rate, integrated so as to provide a beam angle command. With the beam driven in this fashion, the monopulse radar electronics 25 measures the line-of-sight rate directly, as the beam is independently stabilized inertially to negate body motion and the LOS error ($\epsilon_{YM}$) being fed back through an integrator (Block 29) therefore represents the inertial LOS rate required to maintain track. Block 35 provides conventional track loop compensation to drive the LOS error to zero while providing the steady state output required of the track loop.

The body coupling loop of the present invention corrects for the effects of body coupling upstream of the monopulse radar electronics where those effects are introduced by inertially stabilizing the seeker beam. Cancellation thus no longer depends on the "goodness" of the angular error predictions $E_{Yest}$ obtained by the monopulse radar electronics but rather depends on the more nearly ideal characteristics of the rate gyro 27 and the beam steering electronics 33 as indicated by the new PATH A. Beam steering errors are inherently very small, the beam steering electronics 33 having an absolute pointing error on the order of 0.3 mrad and a switching time of approximately 100 microseconds. The rate gyro 27 is preferably a fiber-optic or other suitable rate gyro having scale factor errors on the order of 0.1% and a bandwidth of approximately 500 Hz. Such gyro are inherently rugged and reasonably inexpensive.

With the beam inertially stabilized, the beam command is then adjusted according to the LOS rate $\lambda_{SY}$. Whereas the beam stabilization path, PATH A, is driven at a relatively high rate, the monopulse radar electronics may be driven at a relatively slow rate to augment the beam steering rate and maintain track. Integration time and track loop filtering may thus be separately optimized without concerning for their effect on body decoupling as in FIG. 3.

Figure 5:
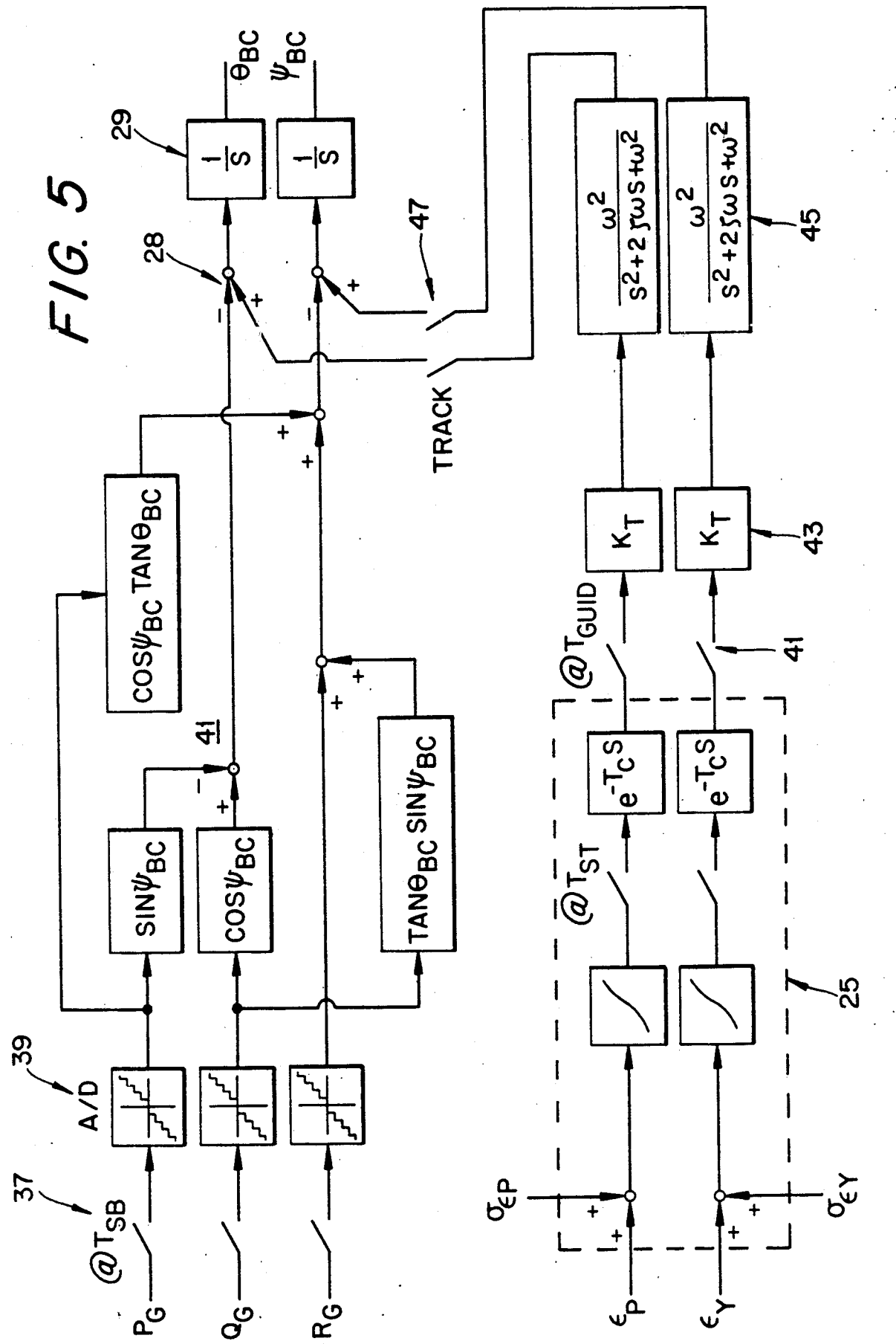
FIG. 5 is a block diagram illustrating a preferred embodiment of the present invention.

Referring to FIG. 5, showing a simplified block diagram of an embodiment of the present invention, the principles heretofore explained in relation to FIGS. 2-4 are extended to include the vertical (pitch) and horizontal (yaw) planes. Tracking errors in pitch and yaw $\epsilon_p$ and $\epsilon_y$, are obtained through the monopulse radar electronics 25 and input through sample switches 41 to a tracking loop which may be closed or opened using switches 47 in order to turn tracking on or off. Pitch, roll and yaw gyro rates $P_G$, $Q_G$ and $R_G$ are obtained from fiber optic or other suitable rate gyros and input to a beam stabilization loop through sample switches 37 and A/D converters 39. The beam stabilization loop is shown implicitly by using as the argument of the trigonometric function of blocks 41, the output beam commands $\theta_{BC}$ and $\psi_{BC}$. In the case of the tracking loop, the loop is completed by the effect of the beam commands on tracking errors $\epsilon_p$ and $\epsilon_y$.

The purpose of the trigonometric functions in blocks 41 is to resolve pitch, roll and yaw variations into variations in pitch and yaw only according to the well-known Euler's rate equations for a stable body. The respective inputs are thus multiplied by the appropriate trigonometric functions to account for all the coupling and cross-coupling path gains. The resulting variations in pitch and yaw are then summed with the corresponding tracking-loop variations at nodes 28 and subsequently integrated in blocks 29 to arrive at beam commands $\theta_{BC}$ and $\psi_{BC}$. Blocks 43 represent convention gain elements as is well-known in the art.

The operation of circuit of FIG. 5 is the same as that of FIG. 4 but extended to both the vertical and horizontal planes. Body motion is detected at a high rate of frequency and the beam of the strapped down seeker inertially stabilized with respect thereto. At the same time, target tracking is also performed and the beam position updated to follow the target. The superposition of these two operations determines the final beam command and the resulting position of the beam.

A number of "real world" refinements are contemplated as the best mode for practicing the present invention. First, second order filters 45 may be inserted into the track look to emulate the physical inertia of a gimballed system. In this manner track loop noise and glint do not needlessly excite the wide bandwidth rate stabilization loop. The tracking update rate may also be increased from the normal 10 to 20 Hz to more than 100 Hz to minimize phase lag around the radome slope path, increasing tolerance to residual body coupling produced by non-idealities in the beam pointing loop. To minimize track loop phase lags, LOS rates may be measured ahead of the second order tracking noise filters. Finally, the pitch and yaw gyro scale factors may be biased in the negative feedback direction to enhance loop stability tolerances by minimizing the asymmetry in the plus and minus feedback sensitivities.

By the method and apparatus of the present invention, strapped down guidance for guided weapons may be accurately and reliability employed, the otherwise destabilizing effects of residual body coupling being overcome. Greatest advantage may therefore be taken of recent and still yet to come innovations in millimeter wave devices and fiber optic and other rate gyros. To further advantage, the accuracy of monopulse radar electronics is increased since precise inertial beam stabilization increases allowable integration time and reduces smearing.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Apparatus mounted in a first moving body for tracking a second moving body, comprising:
   an array of antenna elements mounted in said first body;
   means, mounted in said first moving body, for determining roll, pitch, and yaw parameters of motion of said first moving body; and
   means, responsive to the parameter determining means and connected to said array, for driving said array elements in accordance with the determined parameters of motion to direct a beam of radiation from said array in a direction substantially independent of said motion of said first body, accounting for cross-coupling between roll, pitch, and yaw.

2. The apparatus of claim 1, wherein said means for determining parameters of motion of said first moving body comprises a fiber optic rate gyro.

3. The apparatus of claim 2, wherein said means for driving said array elements comprises circuitry for realizing a plurality of trigonometric functions.

4. The apparatus of claim 3, wherein said plurality of trigonometric functions include a plurality of simple trigonometric functions of a single variable and a plurality of compound trigonometric functions of more than one variable.

5. The apparatus of claim 3, wherein said plurality of trigonometric functions represent Euler's rate equations for a stable body and resolve pitch, roll and yaw variations of said first moving body into equivalent pitch and yaw variations only.

6. A method for use in a first moving body to track a second moving body, comprising the steps of:
   determining roll, pitch, and yaw parameters of motion of said first moving body; and
   driving an array of antenna elements in accordance with the determined parameters to direct a beam of radiation from said array in a direction substantially independent of said motion of said first body, accounting for cross-coupling between roll, pitch, and yaw.

7. The method of claim 6, wherein said driving step includes resolving pitch, roll and yaw variations into equivalent variations in pitch and yaw only and using said equivalent variations in pitch and yaw only to direct said beam of radiation.

8. A guided weapon comprising:
target tracking means including beam radiating antenna means pointed electronically without mechanical adjustment, for tracking a position of a target relative to said guided weapon;
body motion detection means for detecting body motion of said guided weapon; and
means for pointing said radiating antenna in such a direction as to compensate for said body motion.

9. The guided weapon of claim 8, wherein said body motion detection means comprises a fiber-optic gyro.

10. The guided weapon of claim 8, wherein said target tracking means is of the monopulse-radar type.

11. The guided weapon of claim 10, wherein said means for pointing inertially stabilizes said beam during a monopulse integration.

12. The guided weapon of claim 11, wherein said means for pointing inertially stabilizes said beam continuously.

13. A method of controlling a guided weapon having a target tracker including a tracking loop for tracking position of a target and a stabilizing loop for stabilizing an observation platform, comprising the steps of:
inertially stabilizing a beam radiated from an electronically steerable, strap-down seeker; and
performing track loop filtering of monopulse radar returns without regard to beam stabilization, whereby said tracking loop and said stabilizing loop are substantially decoupled, allowing said loops to be separately optimized.

14. A method of controlling a guided weapon comprising the steps of:
electronically stabilizing a radar beam relative to an inertial frame of reference; and
deflecting said radar beam to track the position of a target relative to said guided weapon.

15. The method of claim 14, wherein electronically stabilizing said radar beam comprises detecting pitch, roll and yaw rates of said guided weapon and computing from said rates a pitch beam command and a yaw beam command.

16. The method of claim 14, wherein deflecting said radar beam comprises detecting pitch and yaw beam-pointing errors and adding said beam-pointing errors to said beam commands.

17. The method of claim 16, wherein said deflecting of said radar beam is performed at a rate above 100 Hz.

18. The method of claim 16, wherein second-order filtering is applied to beam pointing error signals to emulate a gimballed seeker.

19. A strap-down seeker, comprising:
monopulse-type radar means for detecting the position of a moving object;
a phased-array type antenna responsive to said monopulse-type radar means for radiating and receiving electromagnetic radiation;
rate detection means for detecting pitch, roll and yaw rates of a guided weapon;
computation means responsive to said pitch, roll and yaw rates for computing a beam command; and
beam steering means responsive to said beam command to stabilize a radar beam radiated by said antenna relative to an inertial reference frame and responsive to an error signal from said monopulse radar means to track the position of said moving object.

20. The strap-down seeker of claim 19, further comprising second-order filter means for filtering said error signal to emulate inertia of a gimballed seeker.

* * * * *